United States Patent
Chen et al.

(10) Patent No.: US 9,225,432 B2
(45) Date of Patent: Dec. 29, 2015

(54) SYSTEM AND METHOD FOR A MULTI-WAVELENGTH COHERENT RECEIVER

(71) Applicant: Huawei Technologies Co., Ltd., Shenzhen (CN)

(72) Inventors: Chen Chen, Ottawa (CA); Zhuhong Zhang, Ottawa (CA); Chuandong Li, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/175,423

(22) Filed: Feb. 7, 2014

(65) Prior Publication Data
US 2015/0229409 A1    Aug. 13, 2015

(51) Int. Cl.
*H04B 10/00*    (2013.01)
*H04B 10/61*    (2013.01)

(52) U.S. Cl.
CPC ........ *H04B 10/6161* (2013.01); *H04B 10/6162* (2013.01)

(58) Field of Classification Search
CPC .................. H04B 10/6161; H04B 10/6162
See application file for complete search history.

(56) References Cited

U.S. PATENT DOCUMENTS

| | | | | |
|---|---|---|---|---|
| 8,103,166 B2* | 1/2012 | Liu | ........................ | H04B 10/61 398/43 |
| 2004/0114939 A1* | 6/2004 | Taylor | .................... | H04B 10/61 398/152 |
| 2011/0008059 A1* | 1/2011 | Chang | .............. | H04B 10/25073 398/202 |
| 2011/0318019 A1 | 12/2011 | Nissov et al. | | |
| 2012/0033965 A1* | 2/2012 | Zhang | ................... | H04B 10/611 398/38 |
| 2012/0185523 A1 | 7/2012 | Hauske et al. | | |
| 2013/0183034 A1* | 7/2013 | Zhang | ............... | H04L 25/03012 398/46 |
| 2014/0099116 A1* | 4/2014 | Bai | ....................... | H04B 10/532 398/76 |

FOREIGN PATENT DOCUMENTS

| | | |
|---|---|---|
| CN | 102439879 A | 5/2012 |
| WO | 2010080721 A1 | 7/2010 |
| WO | 2013139256 A1 | 9/2013 |

OTHER PUBLICATIONS

International Search Report and Written Opinion received in International Application No. PCT/CN2015/072245 mailed May 6, 2015, 12 pages.

* cited by examiner

*Primary Examiner* — Danny Leung
(74) *Attorney, Agent, or Firm* — Slater & Matsil, L.L.P.

(57) ABSTRACT

Embodiments are provided for a novel multi-wavelength coherent receiver (MWCR) design and operation capable of detecting multiple optical wavelength channels. The embodiments include an optical receiver comprising a polarization-diversity optical hybrid module, a multiple wavelength local oscillator (MWLO) coupled to an input of the polarization-diversity optical hybrid module, a plurality of PIN diodes coupled to the polarization-diversity optical hybrid module, a plurality of analog-to-digital converters (ADCs) coupled to the PIN diodes, and a digital signal processing (DSP) module coupled to the ADCs. The polarization-diversity optical hybrid module splits an optical signal into multiple polarization components, wherein the optical signal includes multiple channels at multiple wavelengths. The MWLO locks the optical signal to the multiple wavelengths of the channels simultaneously. The DSP combines the signals from the ADCs corresponding to the polarization components and detects the channels at the wavelengths.

22 Claims, 8 Drawing Sheets

SYSTEM AND METHOD FOR A MULTI-WAVELENGTH COHERENT RECEIVER

TECHNICAL FIELD

The present invention relates to the field of wireless communications, and, in particular embodiments, to a system and method for early termination in iterative null-space directed singular value decomposition.

BACKGROUND

Digital Signal Processing (DSP) based optical coherent receivers have emerged as a suitable solution for 100 Gigahertz (G) and above long-haul optical transport, due to their ability to restore the optical field of a received optical signal. The 100 G coherent receiver is designed to receive an optical signal centered on a single wavelength grid. However, there is a need for a single coherent receiver design that can detect multiple optical wavelength channels, e.g., wavelength division multiplexing (WDM) channels, simultaneously. Such design is advantageous since it allows sharing and simplifying of electro-optics and DSP hardware among the multi-wavelength channels (e.g., WDM channels), and reduces the implementation cost.

SUMMARY OF THE INVENTION

In accordance with an embodiment of the disclosure, a method by an optical receiver for multiple wavelength coherent reception includes receiving an optical signal including multiple channels at multiple wavelengths, and selecting the channels in accordance with input from a multiple wavelength local oscillator (MWLO). The input from the MWLO locks the signal to the multiple wavelengths of the channels simultaneously. The signal is then split into multiple polarization components. The channels in the polarization components are separated using digital signal processing (DSP). The method further includes performing chromatic dispersion compensation (CDC) on the channels, and performing time domain equalization on each of the channels.

In accordance with another embodiment of the disclosure, an optical receiver for multiple wavelength coherent reception includes a polarization-diversity optical hybrid module, a MWLO coupled to an input of the polarization-diversity optical hybrid module, a plurality of PIN diodes coupled to the polarization-diversity optical hybrid module, a plurality of analog-to-digital converters (ADCs) coupled to the PIN diodes, and a DSP module coupled to the ADCs. The polarization-diversity optical hybrid module is configured to split an optical signal into multiple polarization components, wherein the optical signal includes multiple channels at multiple wavelengths. The MWLO is configured to lock the optical signal to the multiple wavelengths of the channels simultaneously. The PIN diodes are configured to convert the polarization components into corresponding electrical signals. Each one of the PIN diodes corresponds to one of the polarization components. The ADCs are configured to convert the electrical signals to digital signals. Each one of the ADCs corresponds to one of the polarization components. The DSP is configured to combine the electrical signals corresponding to the polarization components and detect the channels at the wavelengths.

In accordance with yet another embodiment of the disclosure, an optical receiver for multiple wavelength coherent reception includes a polarization-diversity optical hybrid module, a MWLO coupled to an input of the polarization-diversity optical hybrid module, a plurality of PIN diodes coupled to the polarization-diversity optical hybrid module, a plurality of ADCs coupled to the PIN diodes, a frequency domain equalizer (FDEQ) module for channel slicing and CDC coupled to the ADCs. The polarization-diversity optical hybrid module is configured to split an optical signal into multiple polarization components. The optical signal includes multiple channels at multiple wavelengths. The MWLO is configured to lock the optical signal to the multiple wavelengths of the channels simultaneously. The PIN diodes are configured to convert the polarization components into corresponding electrical signals. Each one of the PIN diodes corresponds to one of the polarization components. The ADCs are configured to convert the electrical signals to digital signals. Each one of the ADCs corresponds to one of the polarization components. The FDEQ module for channel slicing and CDC is configured to combine the electrical signals corresponding to the polarization components and split the channels at the wavelengths.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
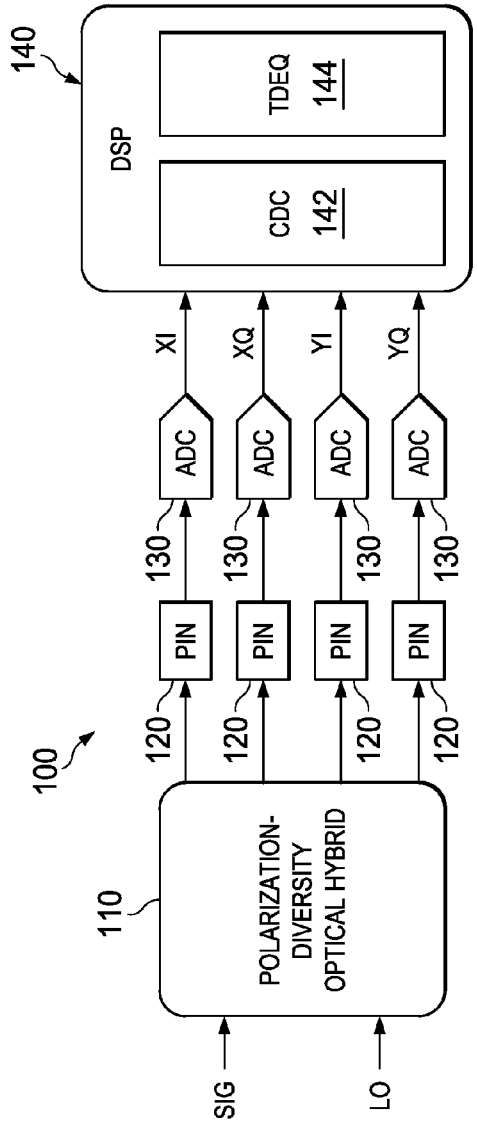
FIG. 1 illustrates a conventional coherent receiver design.

FIG. 1 shows a conventional coherent receiver design 100. The receiver includes polarization-diversity optical hybrid 110 configured to split an incoming optical signal into 4 polarization components of the signal, XI, XQ, YI, and YQ. For instance, the polarization-diversity optical hybrid can be constructed by two polarization beam splitters (PBS's), and two optical hybrids. The polarization-diversity optical hybrid 110 also locks the incoming signal to one designated wavelength according to input from a LO. Each component is then sent to a corresponding PIN diode 120 that converts the optical signal component into an electrical signal component. Each electrical signal component is then converted from analog to digital using an analog-to-digital converter (ADC) 130. The 4 converted components are then processed by a DSP unit 140, using a chromatic dispersion compensation (CDC) block 142 and a time domain equalizer (TDEQ) block 144. This conventional design can detect an optical signal centered on a single wavelength grid, but is not capable to detect multiple optical wavelength channels simultaneously.

Embodiments are provided herein for a novel multi-wavelength coherent receiver (MWCR) design and operation capable of detecting multiple optical wavelength channels, e.g., wavelength division multiplexing (WDM) channels, simultaneously. The MWCR can use the same hardware configuration as a conventional coherent receiver and further uses a tunable multi-wavelength local oscillator (MWLO). By tuning each individual local oscillator (LO) within the MWLO to a specific wavelength, the MWCR can receive and detect WDM signals in both a conventional fixed grid network or in a flexible grid network. The MWCR also uses novel DSP algorithms to de-multiplex the WDM channels and CDC. The DSP design for handling each WDM channel can be similar to that of a conventional coherent receiver. Further, the local oscillator frequency offset (LOFO) estimation and control can be shared among the WDM channels, if the MWLO is frequency locked. This means that the frequency spacing between the multiple local oscillators (LOs) is fixed, preventing the LOs from drifting apart or toward each other over time. Therefore, if one of the LOs is locked, e.g., using a DSP circuit, the other LO's are locked as well.

Figure 2:
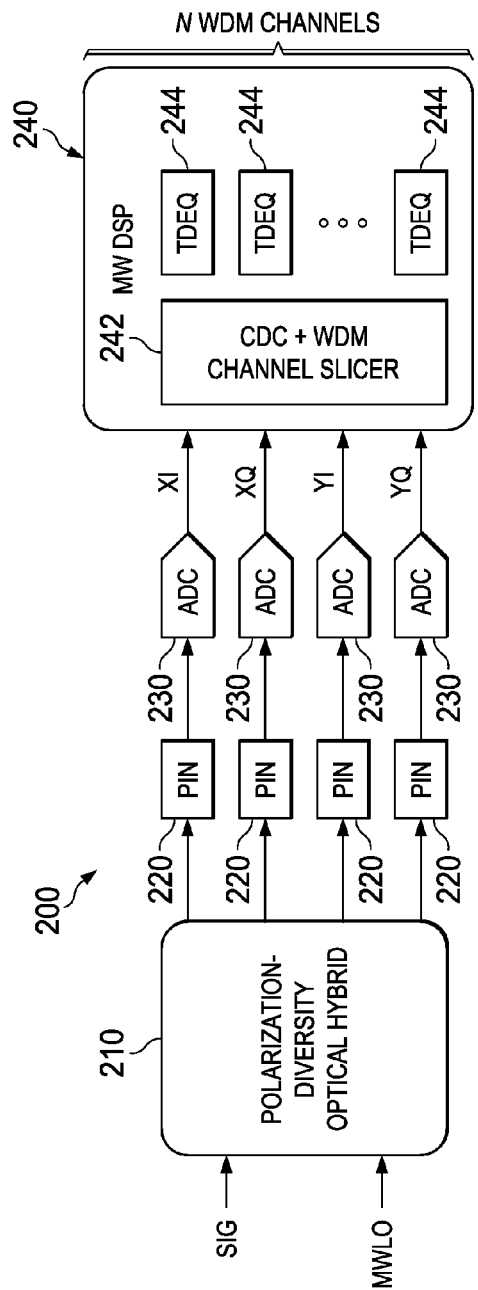
FIG. 2 illustrates an embodiment of a multi-wavelength coherent receiver (MWCR)

FIG. 2 shows an embodiment of a MWCR design 200. The receiver includes a polarization-diversity optical hybrid component 210 configured to split an incoming multi-wavelength optical signal into 4 polarization components of the signal, XI, XQ, YI, and YQ. The component 210 is further configured to lock the incoming signal to multiple wavelengths according to input from a MWLO. The input from the multi-wavelength local oscillator provides multiple-wavelengths for selecting multiple channels of the input optical signal simultaneously. The MWCR design 200 also includes PIN diodes 230 and ADCs 230 similar to corresponding components of the conventional receiver. The MCWR design 200 further includes a multi-wavelength DSP unit 240, which comprises a CDC and WDM channel slicer block or blocks 242 for processing the 4 components, and a TDEQ block 244 for handling each wavelength channel selected by the MWLO input.

Figure 3:
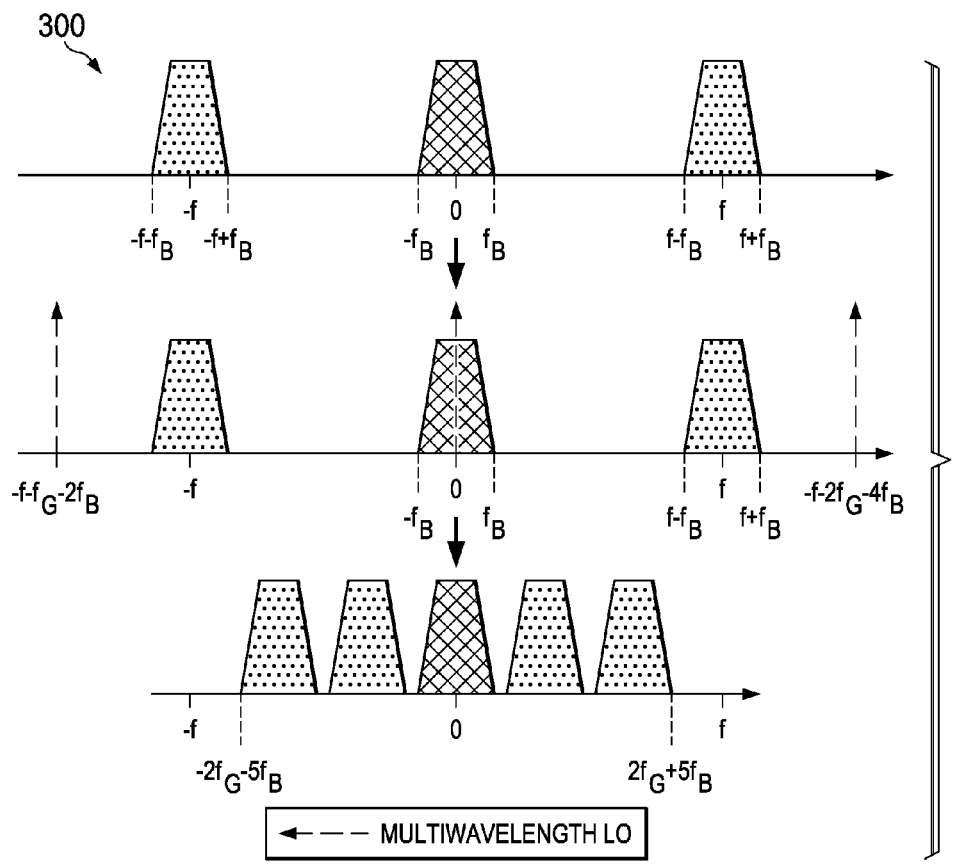
FIG. 3 illustrates an embodiment of a simultaneous coherent reception of WDM channels using a multi-wavelength local oscillator (MWLO)

FIG. 3 shows an embodiment of a simultaneous coherent reception operation 300 of WDM channels using a MWLO. The coherent reception operation 300 can be implemented by the MWCR design 200. The MWCR can use similar hardware configuration as that of a conventional coherent receiver, but with a MWLO and changes to the DSP unit as described above. The top graph in FIG. 3 shows the optical spectrum of the WDM channels arriving at the MWCR. Instead of using a single wavelength LO as in conventional coherent receiver design, the MWLO is used and each wavelength is tuned to have a specific frequency offset from the center of the WDM channels, as shown in the middle graph. As such, multiple WDM channels can be captured simultaneously and allocated in the specific frequency bands within the ADC bandwidth, as shown in the bottom graph. The number of WDM channels to be received is determined by the signal bandwidth and ADC sampling rate. The top spectrum is the optical spectrum before coherent reception, while the bottom spectrum is the electrical spectrum after photo-detection. The wavelengths of the MWLO can be either free-running or frequency-locked to each other. The channel spacing in frequency is f. The multi-wavelength coherent reception operation 300 is of WDM signals on fixed grids.

Figure 4:
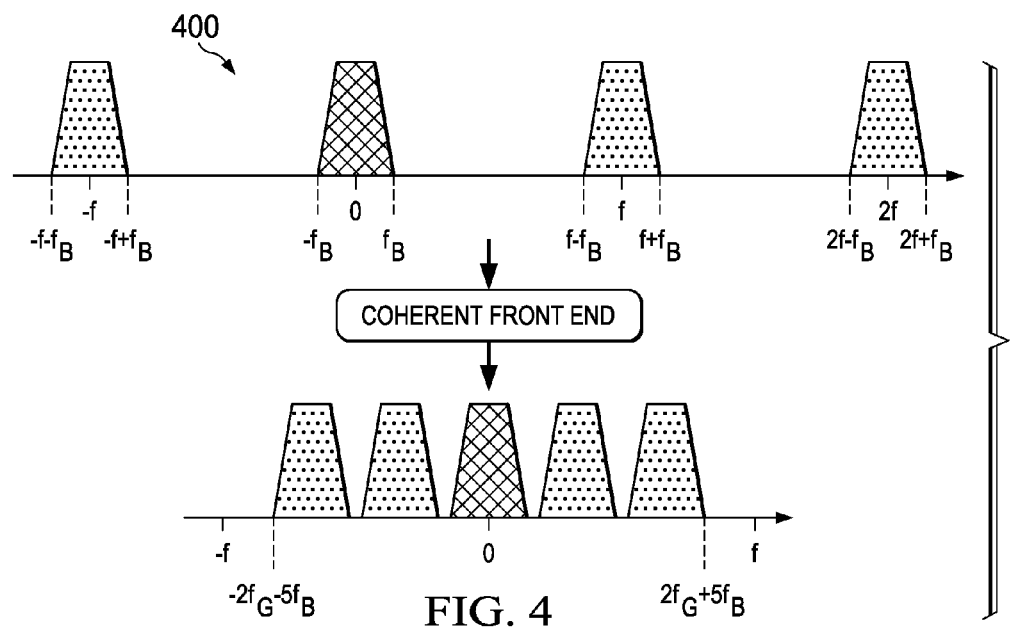
FIG. 4 illustrates an embodiment of a multi-wavelength coherent reception of WDM signals on non-adjacent grids.

FIG. 4 also shows an embodiment of a multi-wavelength coherent reception operation 400 of WDM signals on fixed grids. However, unlike the reception operation 300, the reception operation 400 is on non-adjacent grids. The frequency values $f_B$ and $f_G$ denote the single-sided signal bandwidth and the reserved gap between electrical spectra, respectively. The minimum ADC sampling rate in this scenario is $f_{ADC}=(2N-2)*f_G+(4N-2)*f_B$, where N is the number of WDM channels covered by a single ADC. The number of channels N=3 is considered in both FIGS. 3 and 4. The 3 selected channels are adjacent in FIG. 3 but not in FIG. 4 (the channel centered at f is not selected). The minimum channel spacing is $f_{min}=f_{ADC}/2-f_B$, which ensures that WDM signals do not overlap within ADC bandwidth. Furthermore, the photo-detection can use either single-ended or balanced PIN's, and the PIN has a relatively sharp roll-off outside $f_{ADC}/2$ to avoid aliasing at ADC.

Figure 5:
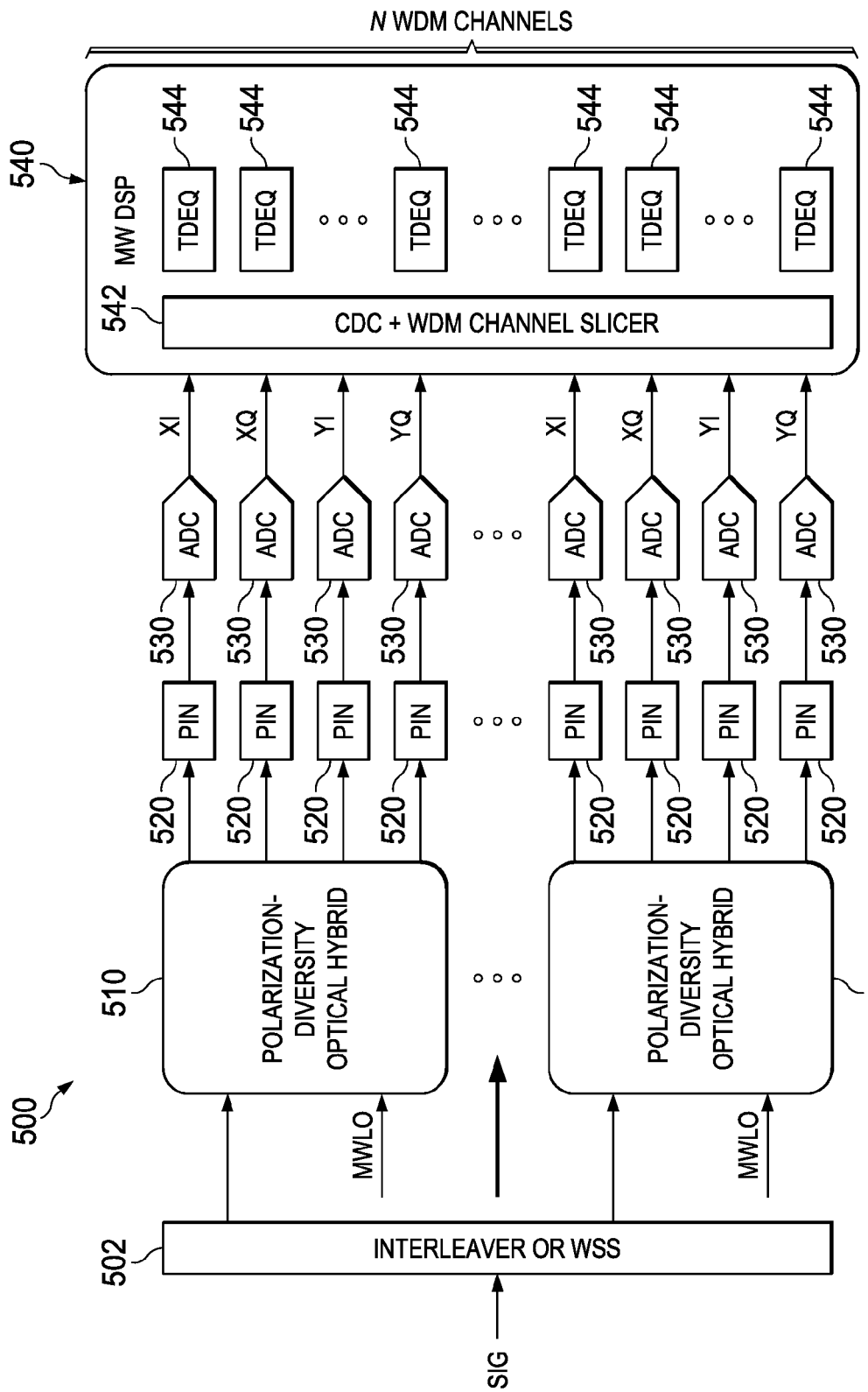
FIG. 5 illustrates an embodiment of a MWCR to receive multiple WDM channels on denser fixed grids.

In the case where WDM signals are located on denser grids than the required minimum channel spacing, a super MWCR design can be used to circumvent this limitation. FIG. 5 shows an embodiment of a MWCR design 500 for receiving WDM channels on denser fixed grids. The MWCR design 500 includes an optical interleaver or a wavelength selective switch (WSS) 502 configured to split an incoming multi-wavelength optical signal into two multi-wavelength signals, which are coarser (in channel density) than the original incoming multi-wavelength signal. Each of the two resulting mufti-wavelength signals may include about half of the number of channels in the original signal. For instance, an interleaver 502 splits the signal into a first multi-wavelength signal with odd wavelength channels and a second multi-wavelength signal with even channels. Alternatively, a WSS 502 splits the signal into two multi-wavelength channels of selected wavelengths. The MWCR design 500 includes further two branches, each comprising a polarization-diversity optical hybrid component 510 using MWLO input, 4 parallel PINS 520 for the 4 component signals from the polarization-diversity optical hybrid component 510, and 4 corresponding ADCs 530. The same MWLO can be used for the two branches. The two branches are coupled, via the ADCs 530, to a multi-wavelength DSP unit 540, which comprises a CDC and WDM channel slicer block or blocks 242 for processing the 4 components, and a TDEQ block 244 for handling each wavelength channel from both branches. The components of each branch are similar to the components of the MWCR design 200. Each branch has a MCWR design similar to the design 200, but shares with the other branches the DSP unit 540 with a total number of TDEQs 544 equal to the total number of channels in the dense grid.

Figure 6:
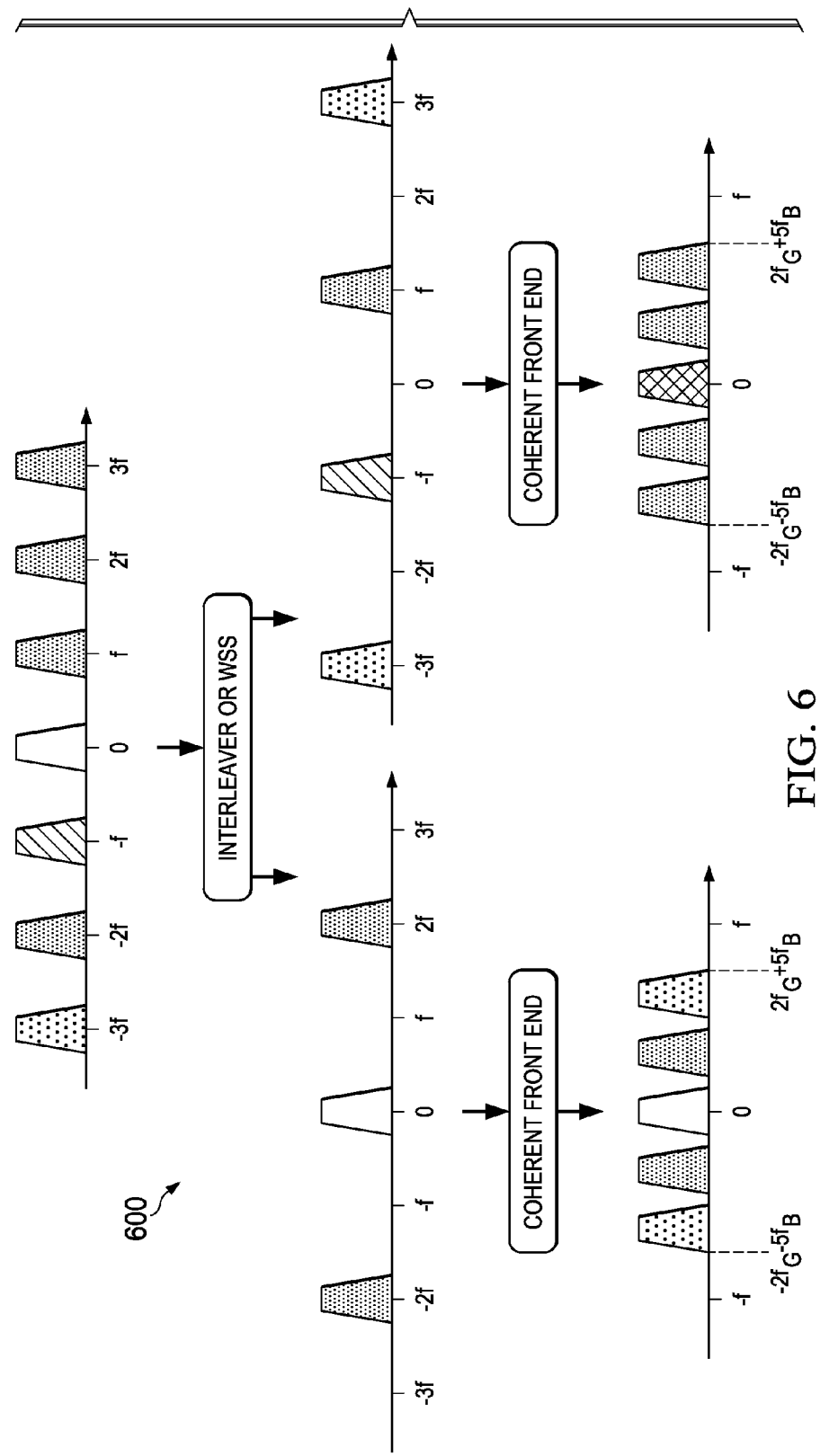
FIG. 6 illustrates an embodiment of a multi-wavelength coherent reception on denser fixed grids.

FIG. 6 shows an embodiment of a multi-wavelength coherent reception operation 600 on denser fixed grids. The coherent reception operation 600 can be implemented by the MWCR design 500. The WDM signals on dense grids (in the top graph) can pass through an interleaver or WSS to produce WDM signals on coarser grids (in the middle graph), and then the multiple MWCR branches are used for detection in corresponding coarse grids (in the bottom graph). In other embodiments, any number of branches (e.g., greater than 2) can be split using a WSS, a hierarchy of interleavers, or any combination of interleavers and/or WSSs. Each branch includes similar components as in MWCR designs 200 and 500.

Figure 7:
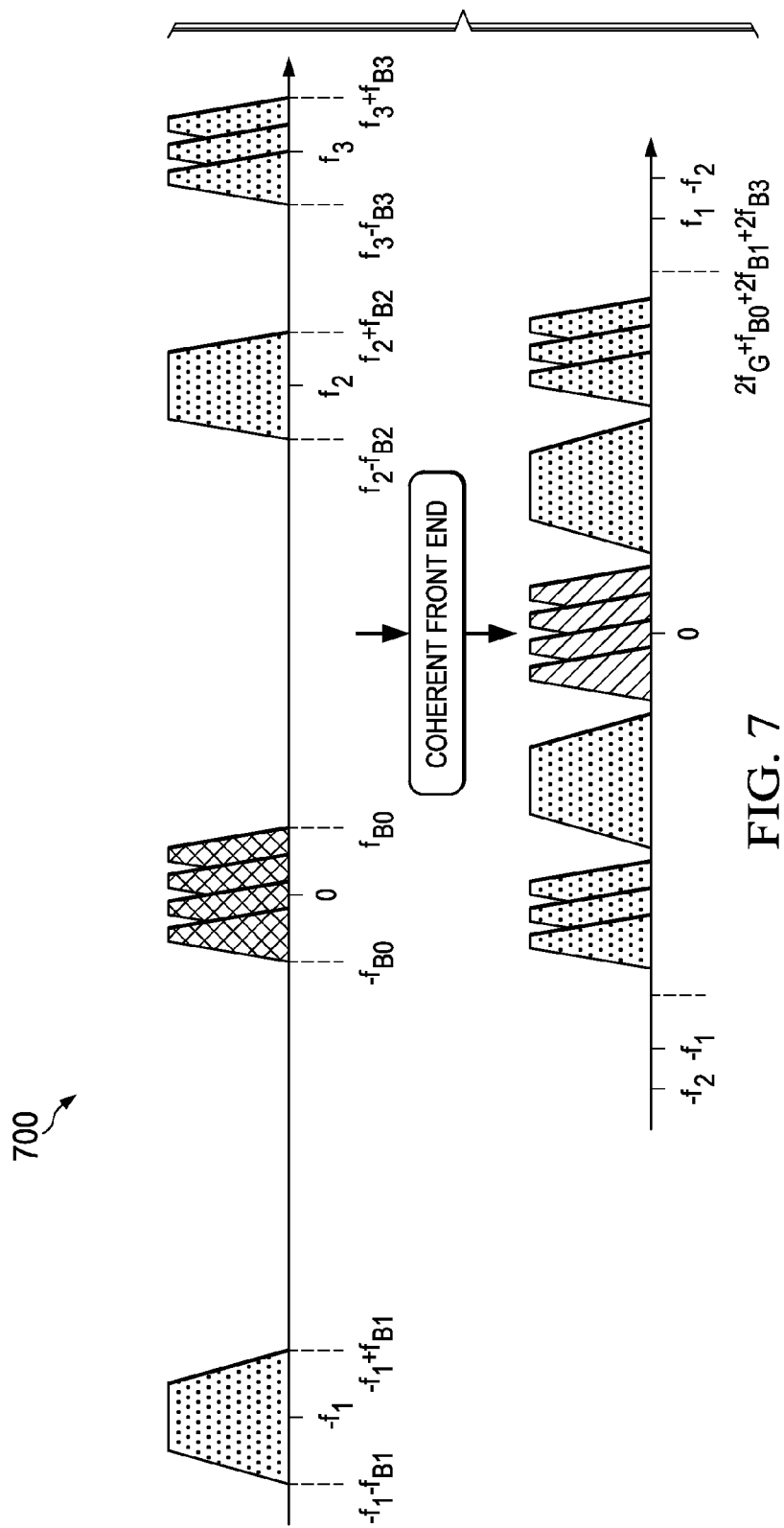
FIG. 7 illustrates an embodiment of a multi-wavelength coherent reception of WDM signals on flexible grids.

Another advantage of the MWCR designs above is the ability to operate in a flexible grid network. FIG. 7 shows an embodiment of a multi-wavelength coherent reception operation 700 of WDM channels on flexible grids. Multiple WDM signals with different channel spacing grids (in the top graph) can be selected using the MWLO and hence detected (in the bottom graph). Grids of multiple channels can also be included in the detection. For example, the grid centered around f=0, while the adjacent grids include single channels. The MWCR design and operation in the embodiments above are independent of the actual modulation format of the WDM channels, which can be single-carrier, OFDM, super-channel, or other modulations.

Figure 8:
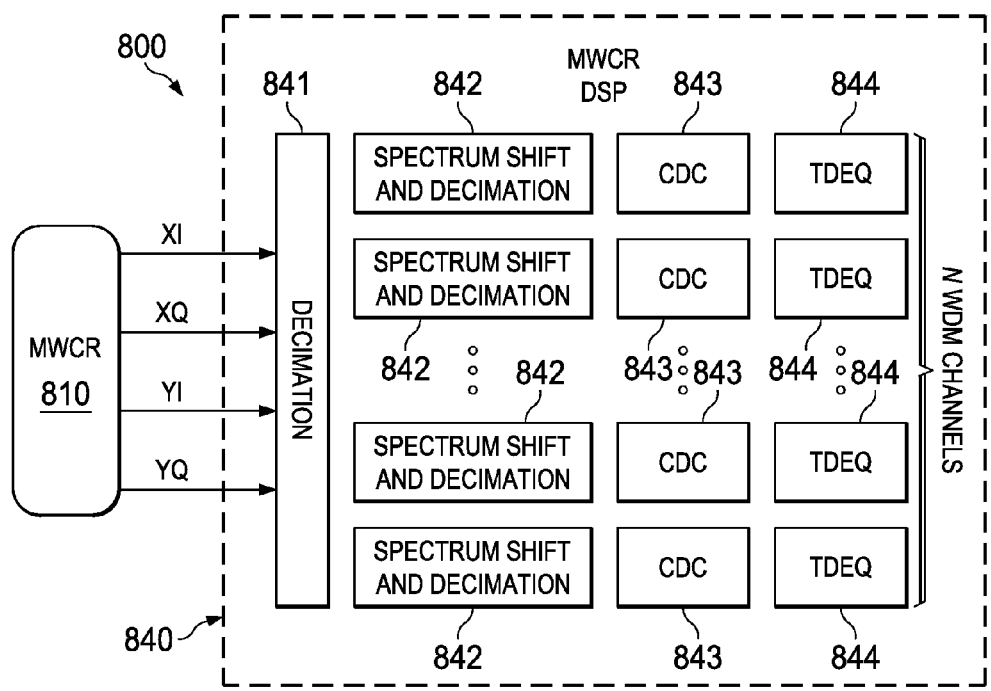
FIG. 8 illustrates an embodiment of a data path in MWCR DSP.

FIG. 8 shows an embodiment of a data path 800 in MWCR DSP, which can be used in any of the MCWR designs above. A MWCR DSP 840 receives 4 signal components (for multi-wavelength or WDM channels) from a MWCR 810. The MWCR DSP 840 includes a decimation block 841 coupled to a plurality of branches each for processing one of the channels in the signal. Each branch includes a spectrum shift and decimation block 842, a CDC block 843, and a TDEQ block 844. The components from the MWCR 810 are 4 ADC signals (XI, XQ, YI and YQ). The decimation function at block 841 is optional. If used, the block 841 can reduce the number of samples for subsequent DSP blocks, e.g., if ADC sampling rate is excessive compared to WDM signal bandwidth. The decimation block 841 also serves the purpose of receiving and combining the signal components for DSP. Alternatively, any suitable DSP module (not shown) can be used, e.g., a filter instead of the decimation block 841, for receiving and combining the signal components. The following spectrum shift and decimation block 842 is needed to separate the WDM signals. Each WDM signal is frequency shifted to baseband, decimated to eliminate the other WDM signals, and then down-sampled to the desired number of samples per symbol. For each WDM signal, the subsequent DSP blocks, including the CDC 843, TDEQ 844, and possibly carrier recovery (CR) and decision blocks, are similar to DSP blocks used in the single-channel coherent receiver.

Figure 9:
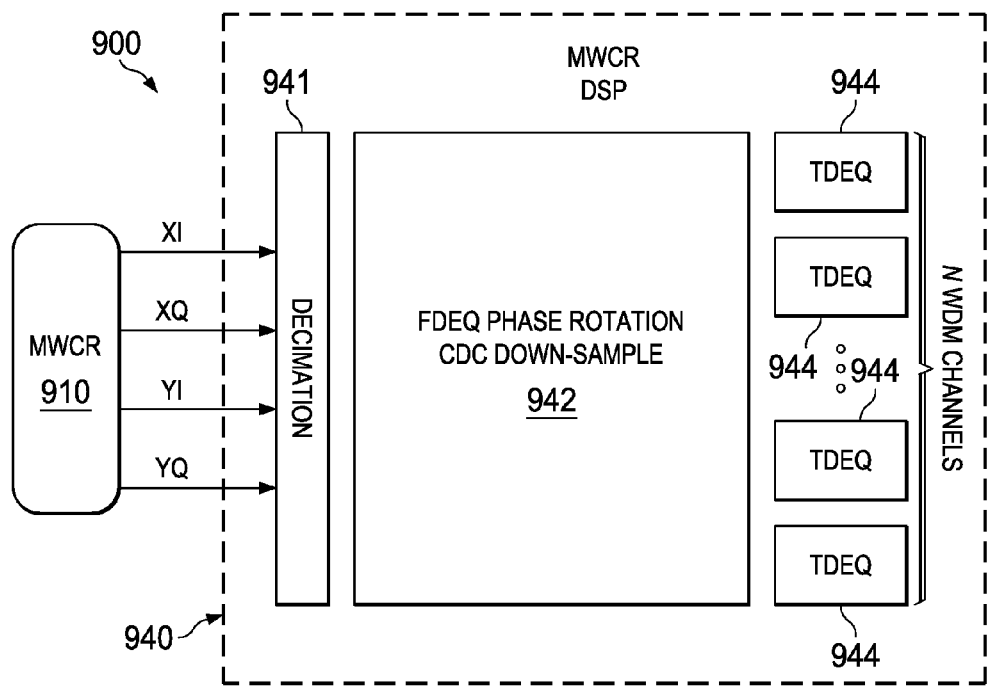
FIG. 9 illustrates another embodiment of a data path in MWCR DSP.

FIG. 9 shows another embodiment of a data path 900 in MWCR DSP, which can be used in any of the MCWR designs above. A MWCR DSP 940 receives 4 signal components (for multi-wavelength or WDM channels) from a MWCR 910. The MWCR DSP 940 includes a decimation block 941 coupled to a frequency domain equalizer (FDEQ) block 942 and a plurality of TDEQ blocks 944, each for handling one of the wavelength channels. The FDEQ block 942 performs phase rotation, CDC, and down-sampling functions on the signal components. Because spectrum shift, decimation and CDC can be processed in frequency domain, the WDM signal separation and CDC can be implemented using a single FDEQ block 942. Additionally, a phase rotation can be performed to remove the constant phase shift among the WDM signals. The frequency-shifted copies of the inverse CD are then obtained so that CDC can be performed for all the WDM channels simultaneously. The inverse CD operation in DSP uses DSP filter coefficients to undo the channel response caused by actual CD seen by the receiver. The WDM signals are then separated by taking samples from their corresponding frequency bins. Therefore, CDC can be implemented either on per channel basis or jointly for all the WDM channels. The MWCR DSP functions in the embodiments above (as shown in FIGS. 8 and 9) can be implemented using software, hardware, or a combination of both.

Figure 10:
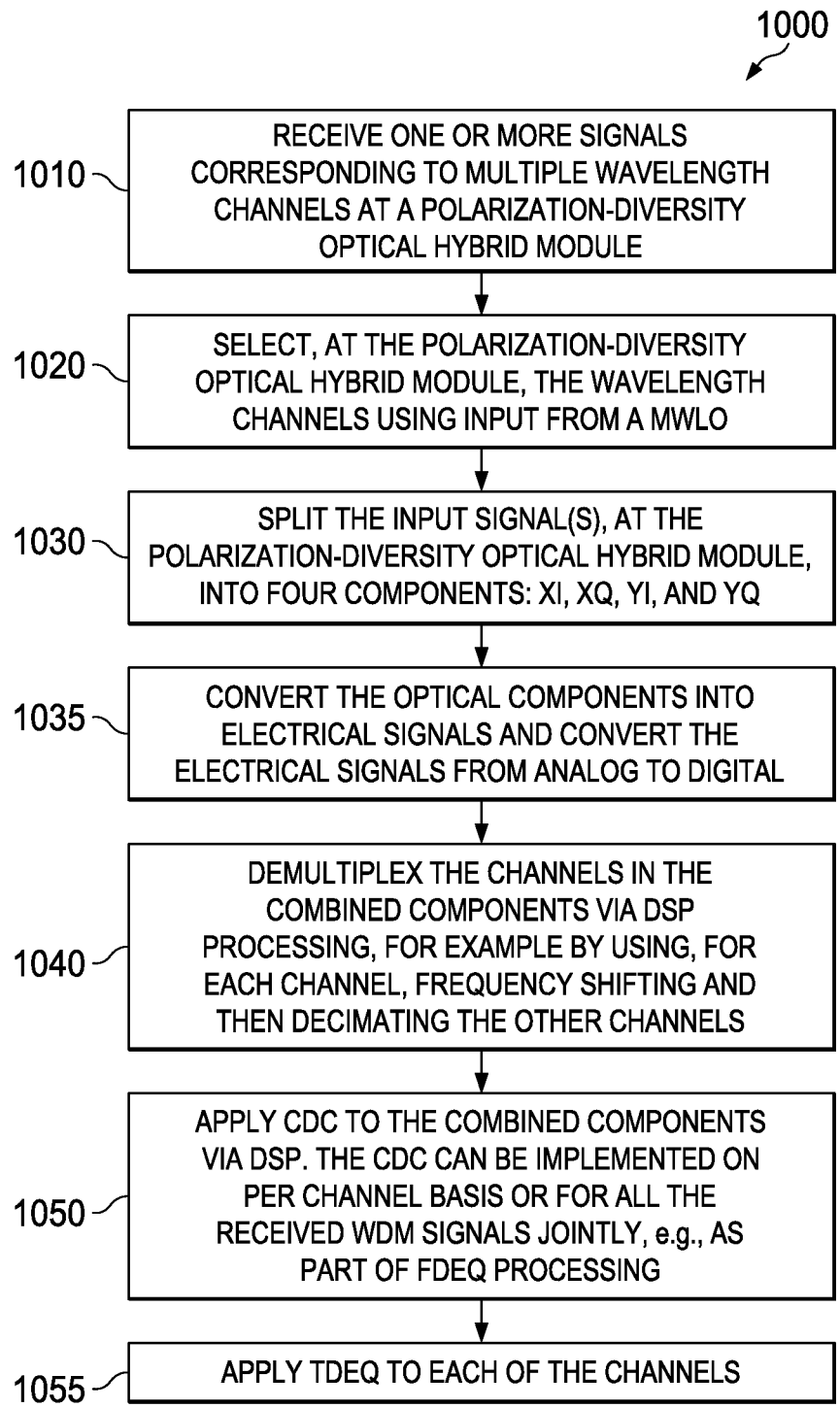
FIG. 10 illustrates an embodiment of a method for MWCR.

FIG. 10 is a flowchart of an embodiment method 1000 for MWCR operation. The method 1000 can be implemented using any of the MWCR designs above. At step 1010, one or more signals corresponding to multiple wavelength channels are received at a polarization-diversity optical hybrid module. The signals may be WDM signals, DWDM signals, or other multi-wavelength channel signals. At step 1020, the wavelength channels are selected, at the polarization-diversity optical hybrid module, using input from a MWLO. The local oscillator frequency offset (LOFO) estimation and control can be shared among the WDM channels, if the MWLO is frequency locked. At step 1030, the input signal(s) are split, at the polarization-diversity optical hybrid module, into 4 components: XI, XQ, YI, and YQ. Each component includes all the selected wavelength channels. At step 1035, the optical components are converted into electrical signals, via corresponding PINS, and then converted to digital signals, via corresponding ADCs. At step 1040, the channels for the combined components are demultiplexed (separated) via DSP processing, for example by using, for each channel, frequency shifting and then decimating the other channels. At step 1050, CDC is applied to the combined components via DSP. The CDC can be implemented on per channel basis or for all the received WDM signals jointly, e.g., as part of FDEQ processing. At step 1055, TDEQ is applied to each of the channels.

Figure 11:
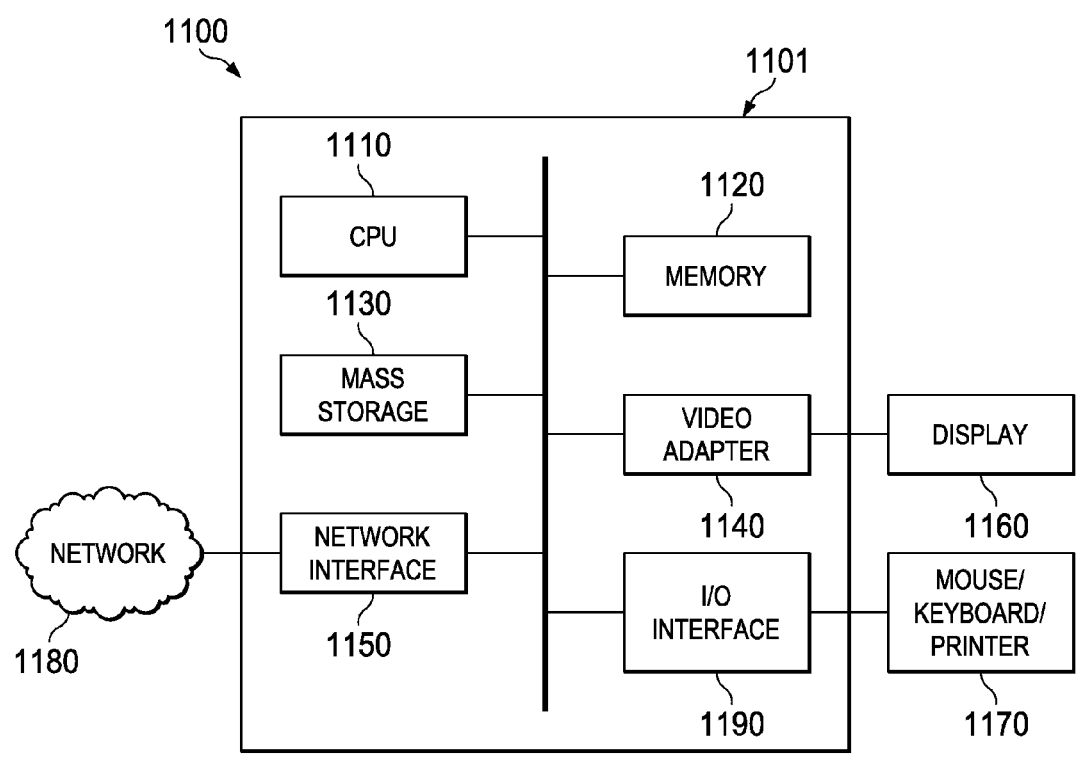
FIG. 11 is a diagram of a processing system that can be used to implement various embodiments.

FIG. 11 is a block diagram of an exemplary processing system 1100 that can be used to implement any of the embodiments above. For example, the processing system 1100, or at least a subset of the system 1100, is part of the mobile phone 100 or 900. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1100 may comprise a processing unit 1101 equipped with one or more input/output devices, such as a network interfaces, storage interfaces, and the like. The processing unit 1101 may include a central processing unit (CPU) 1110, a memory 1120, a mass storage device 1130, and an I/O interface 1160 connected to a bus. The bus may be one or more of any type of several bus architectures including a memory bus or memory controller, a peripheral bus or the like.

The CPU 1110 may comprise any type of electronic data processor. The memory 1120 may comprise any type of system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs. In embodiments, the memory 1120 is non-transitory. The mass storage device 1130 may comprise any type of storage device configured to store data, programs, and other information and to make the data, programs, and other information accessible via the bus. The mass storage device 1130 may comprise, for example, one or more of a solid state drive, hard disk drive, a magnetic disk drive, an optical disk drive, or the like.

The processing unit 1101 also includes one or more network interfaces 1150, which may comprise wired links, such as an Ethernet cable or the like, and/or wireless links to access nodes or one or more networks 1180. The network interface 1150 allows the processing unit 1101 to communicate with remote units via the networks 1180. For example, the network interface 1150 may provide wireless communication via one or more transmitters/transmit antennas and one or more receivers/receive antennas. In an embodiment, the processing unit 1101 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by an optical receiver for multiple wavelength coherent reception, the method comprising:
   receiving an optical signal including multiple wavelength division multiplexed (WDM) channels at multiple wavelengths;
   selecting the WDM channels in accordance with input wavelengths from a multiple wavelength local oscillator (MWLO), wherein a frequency of each of the input wavelengths of the MWLO is offset from a center frequency of a corresponding one of the WDM channels, and wherein the input wavelengths from the MWLO lock the signal to the multiple wavelengths of the WDM channels simultaneously;
   splitting the signal into multiple polarization components;
   separating the WDM channels in the polarization components using digital signal processing (DSP);
   performing chromatic dispersion compensation (CDC) on the WDM channels; and
   performing time domain equalization on each of the WDM channels.

2. The method of claim 1 further comprising:
   converting the polarization components to electrical signals;
   converting the electrical signals to digital signals; and
   combining the electrical signals, corresponding to the polarization components, for digital signal processing prior to separating the WDM channels.

3. The method of claim 1, wherein separating the WDM channels in the polarization components using DSP comprises:
   for each of the WDM channels, shifting a spectrum of the polarization components to a wavelength corresponding to one of the WDM channels; and
   for each of the WDM channels, decimating all remaining WDM channels in the shifted spectrum.

4. The method of claim 3, wherein chromatic dispersion compensation is performed on each one of the WDM channels subsequent to decimating the shifted spectrum.

5. The method of claim 1, wherein chromatic dispersion compensation is performed on the WDM channels combined using frequency domain equalization, and wherein the method further comprises:
   performing phase rotation on the WDM channels combined as part of the frequency domain equalization; and
   performing down-sampling on the WDM channels combined as part of the frequency domain equalization.

6. The method of claim 1 further comprising:
   fixing a frequency of the MWLO; and
   sharing local oscillator frequency offset (LOFO) estimation and control among the WDM channels.

7. An optical receiver for multiple wavelength coherent reception, the optical receiver comprising:
   a polarization-diversity optical hybrid module configured to split an optical signal into multiple polarization components, wherein the optical signal includes multiple wavelength division multiplexed (WDM) channels at multiple wavelengths;
   a multiple wavelength local oscillator (MWLO) coupled to an input of the polarization-diversity optical hybrid module, the MWLO providing input wavelengths to the polarization-diversity optical hybrid module, wherein a frequency of each of the input wavelengths of the MWLO is offset from a center frequency of a corresponding one of the WDM channels, and wherein the input wavelengths from the MWLO lock the optical signal to the multiple wavelengths of the WDM channels simultaneously;
   a plurality of PIN diodes coupled to the polarization-diversity optical hybrid module, and configured to convert the polarization components into corresponding electrical signals, wherein each one of the PIN diodes corresponds to one of the polarization components;
   a plurality of analog-to-digital converters (ADCs) coupled to the PIN diodes, and configured to convert the electrical signals to digital signals, wherein each one of the ADCs corresponds to one of the polarization components; and
   a digital signal processing (DSP) module coupled to the ADCs, and configured to combine the electrical signals corresponding to the polarization components and detect the WDM channels at the wavelengths.

8. The optical receiver of claim 7, wherein the DSP module comprises:
   a plurality of spectrum shift and decimation modules, and configured to select the multiple WDM channels, wherein each one of the spectrum shift and decimation modules corresponds to one of the WDM channels;

a plurality of chromatic dispersion compensation (CDC) modules coupled to the spectrum shift and decimation modules, and corresponding to the WDM channels; and a plurality of time domain equalizer (TDEQ) modules coupled to the CDC modules, and corresponding to the WDM channels.

9. The optical receiver of claim 7, wherein the DSP module further comprises a decimator positioned between the ADCs and the DSP module, wherein the decimator is configured to reduce a number of samples in the WDM channels.

10. The optical receiver of claim 7 further comprising:
a second polarization-diversity optical hybrid module configured to split a second optical signal into multiple second polarization components, wherein the second optical signal includes multiple second WDM channels at multiple second wavelengths;
a plurality of second PIN diodes coupled to the second polarization-diversity optical hybrid module, wherein each one of the second PIN diodes corresponds to one of the second polarization components; and
a plurality of second ADCs coupled to the PIN diodes and the DSP module, wherein each one of the second ADCs corresponds to one of the second polarization components.

11. The optical receiver of claim 10, wherein the DSP module further comprises:
a plurality of second spectrum shift and decimation modules, wherein each one of the second spectrum shift and decimation modules corresponds to one of the second WDM channels;
a plurality of second CDC modules coupled to the second spectrum shift and decimation modules, and corresponding to the WDM channels; and
a plurality of second TDEQ modules coupled to the second CDC modules, and corresponding to the second WDM channels.

12. The optical receiver of claim 10, wherein the second polarization-diversity optical hybrid module is coupled to the MWLO, and wherein the MWLO is further configured to lock the second optical signal to the second wavelengths of the second WDM channels simultaneously.

13. The optical receiver of claim 10 further comprising an interleaver configured to split an incoming original optical signal into the optical signal and the second optical signal, wherein the incoming original optical signal includes the WDM channels at the wavelengths and the second WDM channels at the second wavelengths.

14. The optical receiver of claim 10 further comprising a wavelength selective switch (WSS) configured to split an incoming original optical signal into the optical signal and the second optical signal, wherein the incoming original optical signal includes the WDM channels at the wavelengths and the second WDM channels at the second wavelengths.

15. An optical receiver for multiple wavelength coherent reception, the optical receiver comprising:
a polarization-diversity optical hybrid module configured to split an optical signal into multiple polarization components, wherein the optical signal includes multiple wavelength division multiplexed (WDM) channels at multiple wavelengths;
a multiple wavelength local oscillator (MWLO) coupled to an input of the polarization-diversity optical hybrid module, the MWLO providing input wavelengths to the polarization-diversity optical hybrid module, wherein a frequency of each of the input wavelengths of the MWLO is offset from a center frequency of a corresponding one of the WDM channels, and wherein the input wavelengths from the MWLO lock the optical signal to the multiple wavelengths of the WDM channels simultaneously;
a plurality of PIN diodes coupled to the polarization-diversity optical hybrid module, and configured to convert the polarization components into corresponding electrical signals, wherein each one of the PIN diodes corresponds to one of the polarization components;
a plurality of analog-to-digital converters (ADCs) coupled to the PIN diodes, and configured to convert the electrical signals to digital signals, wherein each one of the ADCs corresponds to one of the polarization components; and
a frequency domain equalizer (FDEQ) module for channel slicing and chromatic dispersion compensation (CDC) coupled to the ADCs, and configured to combine the electrical signals corresponding to the polarization components and split the WDM channels at the wavelengths.

16. The optical receiver of claim 15 further comprising a plurality of time domain equalizer (TDEQ) modules coupled to the FDEQ module, and corresponding to the WDM channels.

17. The optical receiver of claim 15 further comprising a decimator positioned between the ADCs and the FDEQ module, wherein the decimator is configured to reduce a number of samples in the WDM channels.

18. The optical receiver of claim 15 further comprising:
a second polarization-diversity optical hybrid module configured to split a second optical signal into multiple second polarization components, wherein the second optical signal includes multiple second WDM channels at multiple second wavelengths;
a plurality of second PIN diodes coupled to the second polarization-diversity optical hybrid module, wherein each one of the second PIN diodes corresponds to one of the second polarization components; and
a plurality of second ADCs coupled to the PIN diodes and the FDEQ module, wherein each one of the second ADCs corresponds to one of the second polarization components.

19. The optical receiver of claim 18 further comprising a plurality of second TDEQ modules coupled to the FDEQ module, and corresponding to the second WDM channels.

20. The optical receiver of claim 18, wherein the second polarization-diversity optical hybrid module is coupled to the MWLO, and wherein the MWLO is further configured to lock the second optical signal to the second wavelengths of the second WDM channels simultaneously.

21. The optical receiver of claim 18 further comprising an interleaver configured to split an incoming original optical signal into the optical signal and the second optical signal, wherein the incoming original optical signal includes the WDM channels at the wavelengths and the second WDM channels at the second wavelengths.

22. The optical receiver of claim 18 further comprising a wavelength selective switch (WSS) configured to split an incoming original optical signal into the optical signal and the second optical signal, wherein the incoming original optical signal includes the WDM channels at the wavelengths and the second WDM channels at the second wavelengths.

* * * * *